(12) United States Patent
Mason et al.

(10) Patent No.: US 12,151,597 B2
(45) Date of Patent: *Nov. 26, 2024

(54) HANDLE ANGLE ADJUSTMENT MECHANISM

(71) Applicant: China Wonderland Nurserygoods Co., Ltd., Guangdong (CN)

(72) Inventors: Kyle S. Mason, Lititz, PA (US); Colin F. Eggert-Crowe, Philadelphia, PA (US)

(73) Assignee: China Wonderland Nurserygoods Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,367

(22) Filed: Aug. 10, 2023

(65) Prior Publication Data

US 2023/0382277 A1 Nov. 30, 2023

Related U.S. Application Data

(63) Continuation of application No. 17/368,852, filed on Jul. 7, 2021, now Pat. No. 11,760,236.

(30) Foreign Application Priority Data

Jul. 10, 2020 (CN) .......................... 202021359180.X

(51) Int. Cl.
*B60N 2/28* (2006.01)
(52) U.S. Cl.
CPC ......... *B60N 2/2845* (2013.01); *B60N 2/2842* (2013.01)

(58) Field of Classification Search
CPC ............................ B60N 2/2845; B60N 2/2842
See application file for complete search history.

(56) References Cited

U.S. PATENT DOCUMENTS

| | | | |
|---|---|---|---|
| 4,634,177 A | 1/1987 | Meeker | |
| 5,011,221 A | 4/1991 | Wise | |
| 6,017,088 A | 1/2000 | Stephens | |
| 6,145,927 A | 11/2000 | Lo | |
| 7,488,034 B2 | 2/2009 | Ohren | |
| 7,658,446 B2 | 2/2010 | Meeker | |
| 8,998,312 B2 | 4/2015 | Sellers | |
| 9,371,017 B2 | 6/2016 | Spence | |
| 11,760,236 B2 * | 9/2023 | Mason | ................ B60N 2/2845 297/250.1 |
| 2017/0065098 A1 | 3/2017 | Taylor | |

(Continued)

*Primary Examiner* — Rodney B White
(74) *Attorney, Agent, or Firm* — Volpe Koenig

(57) ABSTRACT

A handle angle adjustment mechanism included a basket, a handle and an adjusting component. The basket includes a plurality of first locking portions. The handle is pivoted to the basket. The adjusting component is disposed between the basket and the handle and slidably on the handle. The adjusting component includes a first engaging portion for engaging with one of the plurality of first locking portions so as to lock the handle with the basket, and the adjusting component can slide to drive the first engaging portion to disengage from the one of the plurality of first locking portions so as to allow the handle to rotate relative to the basket for adjusting an angle of the handle relative to the basket. Therefore, it can prevent the handle from hindering a user from placing a baby on the basket, which facilitates the placement of the baby by the user.

11 Claims, 6 Drawing Sheets

(56) References Cited

U.S. PATENT DOCUMENTS

| | | |
|---|---|---|
| 2020/0361348 A1 | 11/2020 | Mason |
| 2021/0009013 A1 | 1/2021 | Olfers |
| 2021/0146808 A1 | 5/2021 | Liu |

* cited by examiner

HANDLE ANGLE ADJUSTMENT MECHANISM

CROSS REFERENCE TO RELATED APPLICATIONS

This application is a continuation application of U.S. application Ser. No. 17/368,852, now U.S. Pat. No. 11,760,236, filed on Jul. 7, 2021. The content of the application is incorporated herein by reference.

BACKGROUND OF THE INVENTION

1. Field of the Invention

The present invention relates to a baby product field, and more particularly, to a handle angle adjustment mechanism capable of adjusting an angle of a handle and having advantages of simple structure, low production cost, convenient operation and wide range of applications.

2. Description of the Prior Art

A baby basket, also known as a safety basket, has a wide range of applications. It not only can be placed in a car and used as a baby safety seat, but also can be used as a baby's cradle to take the baby out. The baby basket generally includes a basket body and abase detachably connected to each other. The base is used to connect to a car seat. The basket body is provided with a handle for a user to lift. The handle of the conventional baby basket is generally across and fixed to two sides of the basket body, so that the handle will hinder the user when placing the baby on the basket body, which affects the placement of the baby by the user.

SUMMARY OF THE INVENTION

Therefore, an objective of the present invention is to provide a handle angle adjustment mechanism capable of adjusting an angle of a handle and having advantages of simple structure, low production cost, convenient operation and wide range of applications, for solving the aforementioned problems.

In order to achieve the aforementioned objective, the present invention discloses a handle angle adjustment mechanism including a basket, a handle and an adjusting component. The basket includes a plurality of first locking portions. The handle is pivoted to the basket. The adjusting component is disposed between the basket and the handle and slidably on the handle. The adjusting component includes a first engaging portion for engaging with one of the plurality of first locking portions so as to lock the handle with the basket, and the adjusting component can slide to drive the first engaging portion to disengage from the one of the plurality of first locking portions so as to allow the handle to rotate relative to the basket for adjusting an angle of the handle relative to the basket. The handle includes two positioning components arranged in parallel, and the adjusting component is slidably sheathed on the two positioning components.

Preferably, the basket further includes a plurality of first protrusions arranged at intervals along a rotating direction of the handle, and each first locking portion is formed between two adjacent first protrusions of the plurality of first protrusions.

Preferably, each positioning component is formed in a plated structure, the adjusting component further includes an operating portion and a sliding portion connected to the operating portion, and a part of the sliding portion protrudes from the operating portion in a radial direction of the pivotal shaft and is slidably disposed on the two positioning components.

Preferably, an end of the operating portion penetrates out of the handle, the sliding portion is slidably disposed in the handle, and the first engaging portion is disposed on the sliding portion.

Preferably, the basket further includes a plurality of second locking portions, and the adjusting component further includes a second engaging portion for engaging with one of the plurality of second locking portions.

Preferably, the basket further includes a plurality of second protrusions arranged at intervals along a rotating direction of the handle, and each second locking portion is formed between two adjacent second protrusions of the plurality of second protrusions.

Preferably, the plurality of first locking portions are located on an outer periphery of the plurality of second locking portions.

Preferably, a through slot is formed on the adjusting component, and a pivotal shaft where the handle and the basket are pivoted around penetrates through the through slot.

Preferably, the handle angle adjustment mechanism further includes a recovering component for resiliently recovering the adjusting component, and the recovering component is disposed in the through slot and connected between the pivotal shaft and the adjusting component.

Preferably, two ends of the handle are pivotally connected to two sides of the basket, and the handle stretches across the basket.

Preferably, an accommodating space is formed inside the basket for accommodating a baby.

In summary, the adjusting component can slide to drive the first engaging portion to disengage from one of the plurality of first locking portions so as to allow the handle to rotate relative to the basket for adjusting an angle of the handle relative to the basket. Therefore, it can prevent the handle from hindering a user from placing a baby on the basket, which facilitates the placement of the baby by the user. Besides, the handle angle adjustment mechanism of the present application has advantages of simple structure, low production cost, convenient operation and wide range of applications.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
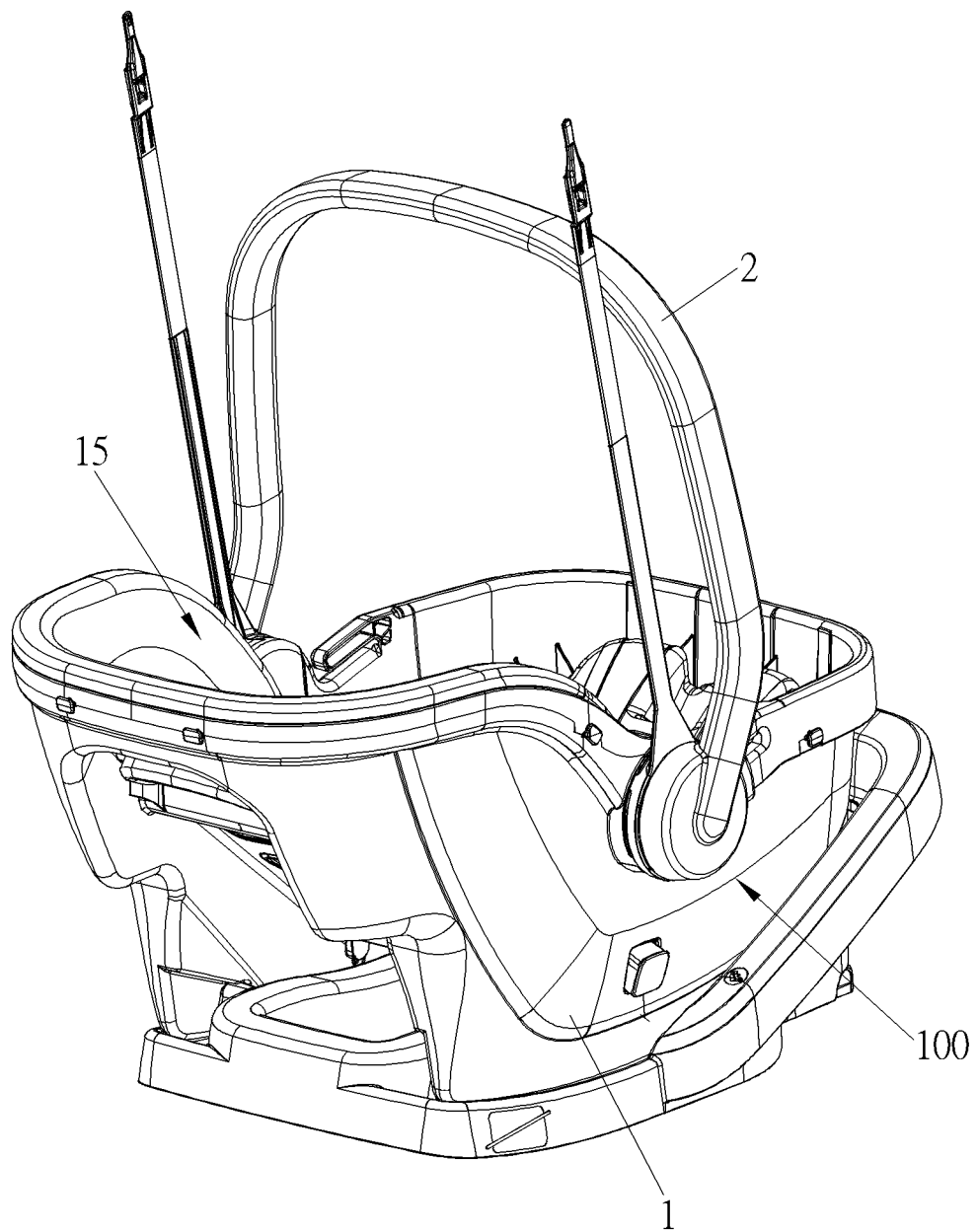
FIG. 1 is a schematic drawing of a basket and a handle of the present application.
Figure 2:
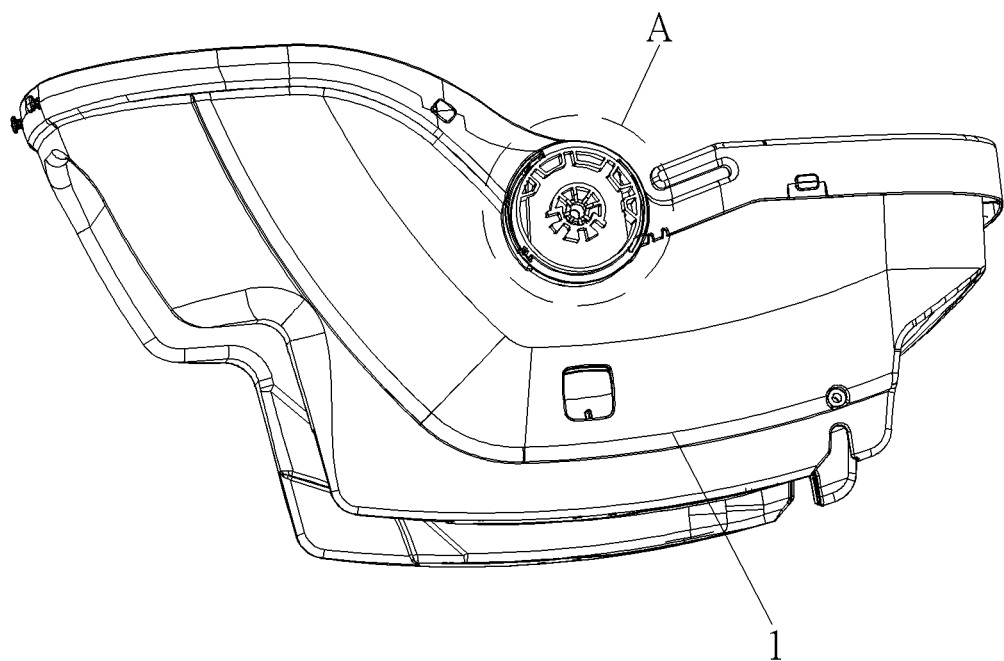
FIG. 2 is a structural diagram of the basket of the present application.
Figure 3:
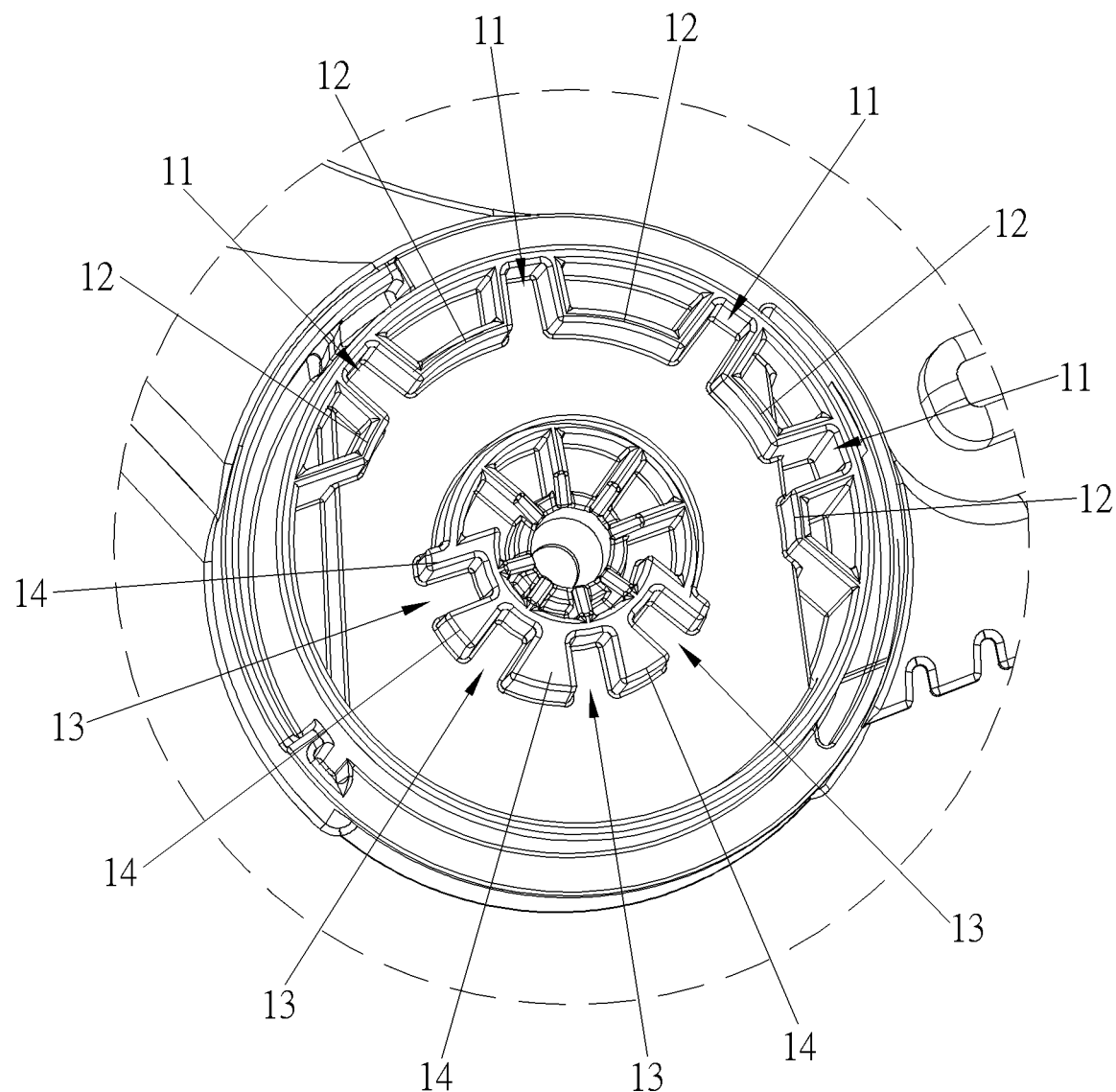
FIG. 3 is an enlarged diagram of a portion A of FIG. 2 of the present application.
Figure 4:
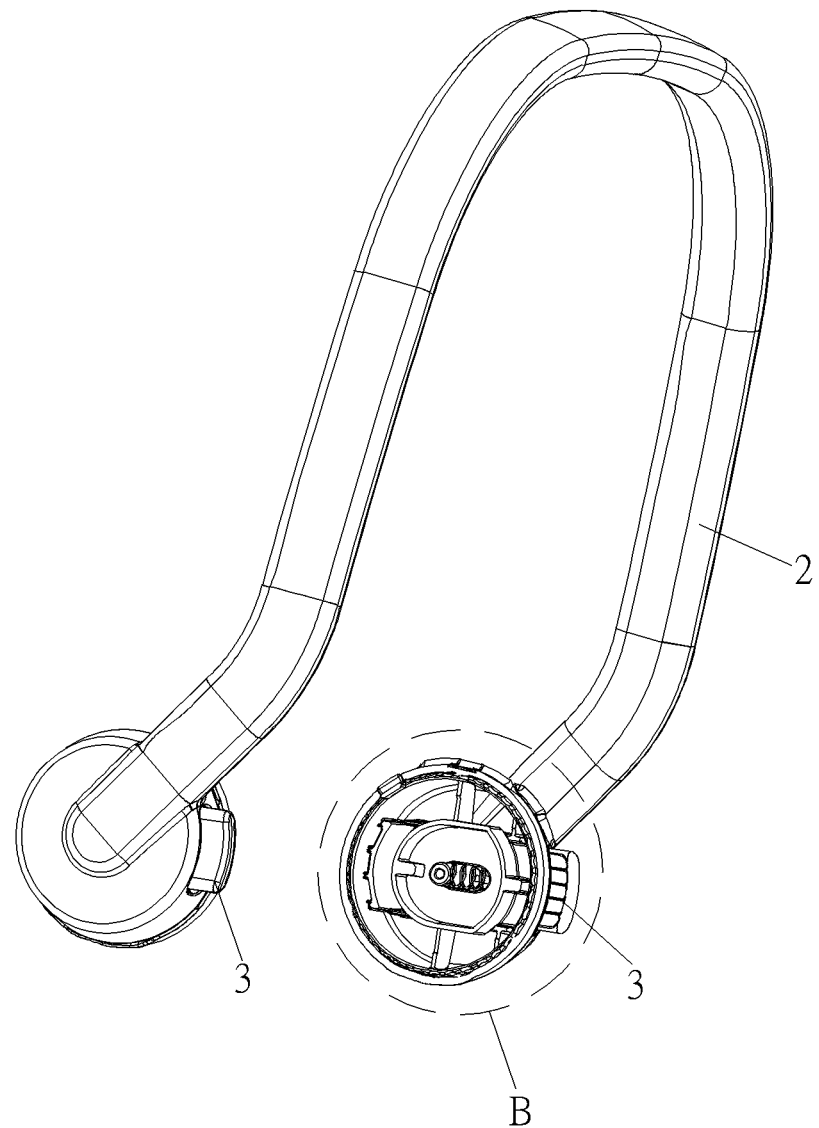
FIG. 4 is a structural diagram of the handle of the present application.
Figure 5:
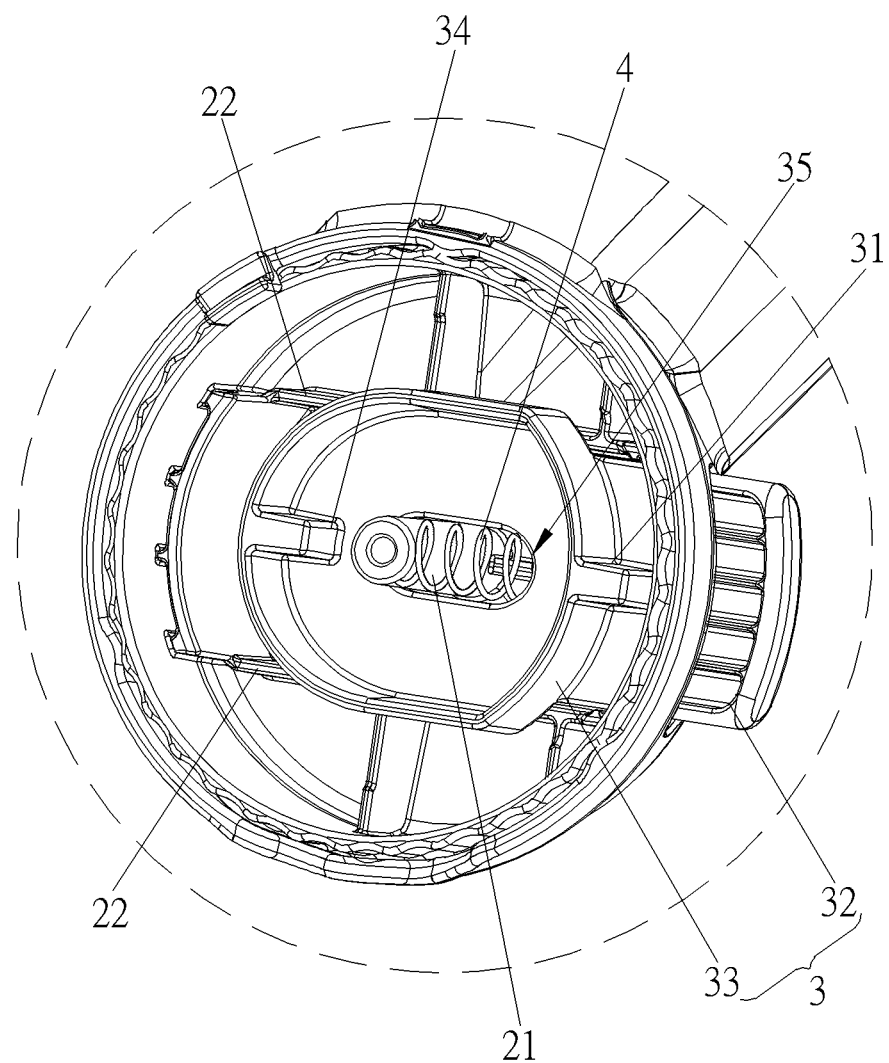
FIG. 5 is an enlarged diagram of a portion B of FIG. 4 of the present application.
Figure 6:
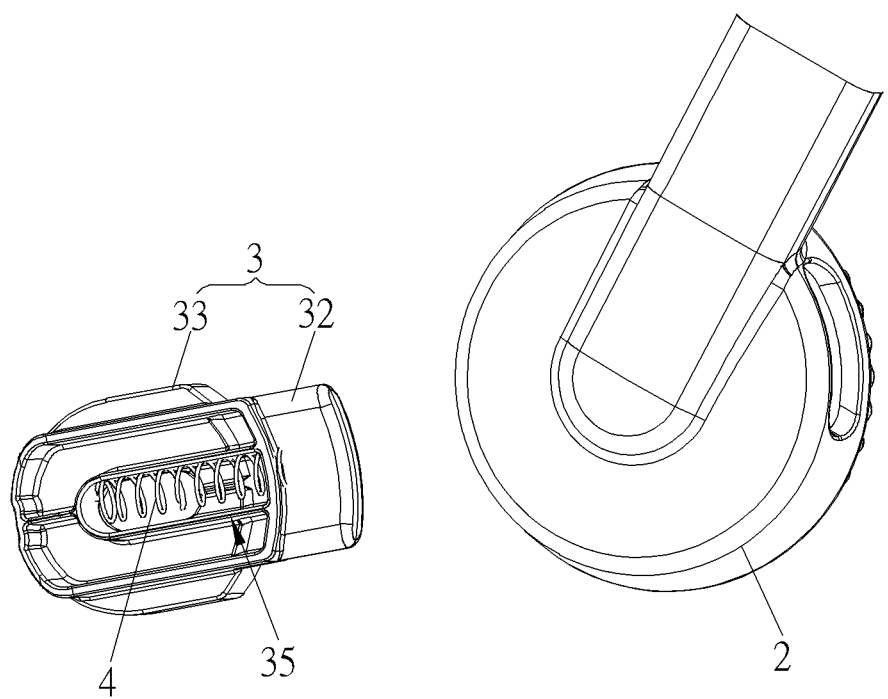
FIG. 6 is a structural diagram of an adjusting component separated from the handle of the present application.

Please refer to FIG. 1 to FIG. 6. FIG. 1 is a schematic drawing of a basket 1 and a handle 2 of the present application. FIG. 2 is a structural diagram of the basket 1 of the present application. FIG. 3 is an enlarged diagram of a portion A of FIG. 2 of the present application. FIG. 4 is a structural diagram of the handle 2 of the present application. FIG. 5 is an enlarged diagram of a portion B of FIG. 4 of the present application. FIG. 6 is a structural diagram of an adjusting component 3 separated from the handle 2 of the present application. A handle angle adjustment mechanism 100 of the present application includes the basket 1, the handle 2 and the adjusting component 3. The handle 2 is pivoted to the basket 1. An accommodating space 15 is formed inside the basket 1 for accommodating a baby. The basket 1 includes a plurality of first locking portions 11. Specifically, the basket 1 further includes a plurality of first protrusions 12 arranged at intervals along a rotating direction of the handle 2, each first locking portion 11 is formed between two adjacent first protrusions 12 of the plurality of first protrusions 12, but it is not limited thereto. The adjusting component 3 is disposed between the basket 1 and the handle 2 and slidably on the handle 2. The adjusting component 3 includes a first engaging portion 31 for engaging with one of the plurality of first locking portions 11 so as to lock the handle 2 with the basket 1. The adjusting component 3 also can slide to drive the first engaging portion 31 to disengage from the one of the plurality of first locking portions 11 for releasing the handle 2, so as to allow the handle 2 to rotate relative to the basket 1 for adjusting an angle of the handle 2 relative to the basket 1. When the handle 2 is rotated to a desired angle, the adjusting component 3 can be driven to slide reversely for driving the first engaging portion 31 to engage with another first locking portion 11, so as to lock the handle 2 and position the handle 2 at the desired angle.

Please refer to FIG. 3 and FIG. 5. The basket 1 further includes a plurality of second locking portions 13, and the adjusting component 3 further includes a second engaging portion 34 for engaging with one of the plurality of second locking portions 13. Specifically, the basket 1 further includes a plurality of second protrusions 14 arranged at intervals along a rotating direction of the handle 2, and each second locking portion 13 is formed between two adjacent second protrusions 14 of the plurality of second protrusions 14. In this embodiment, the plurality of first locking portions 11 are located on an outer periphery of the plurality of second locking portions 13. When the first engaging portion 31 engages with one of the plurality of first locking portions 11, the second engaging portion 34 can also engage with one of the plurality of second locking portions 13, so that the handle 2 can be positioned on the basket 1 more firmly by simultaneous engagements of the first engaging portion 31, the first locking portion 11, the second engaging portion 34 and the second locking portion 13, but it is not limited thereto.

Please refer to FIG. 5 and FIG. 6. The adjusting component 3 further includes an operating portion 32 and a sliding portion 33. An end of the operating portion 32 penetrates out of the handle 2, and the operating portion 32 is connected to the sliding portion 33 and configured to be operated by a user. The sliding portion 33 is slidably disposed in the handle 2, and the first engaging portion 31 and the second engaging portion 34 are disposed on the sliding portion 33. Specifically, a through slot 35 is formed on the adjusting component 3. The handle 2 and the basket 1 can be pivoted to each other via a pivotal shaft 21, and the pivotal shaft 21 where the handle 2 and the basket 1 are pivoted around penetrates through the through slot 35. The through slot 35 can be formed on the sliding portion 33. When the adjusting component 3 is driven to slide, the pivotal shaft 21 can slide in the through slot 35. Furthermore, the handle angle adjustment mechanism 100 further includes a recovering component 4 for resiliently recovering the adjusting component 3, and the recovering component 4 is disposed in the through slot 35 and connected between the pivotal shaft 21 and the adjusting component 3. The recovering component 4 can be a resilient component, such as a spring. When the adjusting component 3 is driven to slide, the adjusting component 3 compresses the recovering component 4 so as to drive the first engaging portion 31 to disengage from the first locking portion 11 and to drive the second engaging portion 34 to disengage from the second locking portion 13. After releasing the adjusting component 3, the adjusting component 3 can slide reversely by the resilient restoring force provided by the recovering component 4, so as to drive the first engaging portion 31 to engage with the first locking portion 11 and to drive the second engaging portion 34 to engage with the second locking portion 13.

Please refer to FIG. 5. The handle 2 includes two positioning components 22 arranged in parallel, and the adjusting component 3 can be slidably sheathed on the two positioning components 22. Each positioning component 22 can be formed in a plated structure. The adjusting component 3 can be oriented by the two positioning components 22, so that the adjusting component 3 can be easily installed in the handle 2 by sliding movement.

Please refer to FIG. 1 and FIG. 4. Two ends of the handle 2 are pivotally connected to two sides of the basket 1 respectively, and the handle 2 stretches across the basket 1. In this embodiment, the adjusting component 3 can be disposed between each of the two ends of the handle 2 and the basket 1, but it is not limited thereto.

Please refer to FIG. 1 to FIG. 6. The operational principle of handle angle adjustment mechanism 100 of the present application is introduced as follows. When it is desired to adjust an angle of the handle 2, the user can operate the operating portion 32 of the adjusting component 3 to slide the adjusting component 3 along the positioning components 22 to compress the recovering component 4, so as to drive the first engaging portion 31 to disengage from the first locking portion 11 and to drive the second engaging portion 34 to disengage from the second locking portion 13, thereby releasing the handle 2 to allow the handle 2 to rotate relative to the basket 1. Therefore, it can prevent the handle 2 from hindering the user from placing the baby on the basket 1, which facilitates the placement of the baby by the user. After the handle 2 is adjusted to a desired angle, the adjusting component 3 can be released to be driven to slide reversely by the resilient restoring force provided by the recovering component 4, so as to drive the first engaging portion 31 to engage with the first locking portion 11 and to drive the second engaging portion 34 to engage with the second locking portion 13 again, thereby positioning the handle 2 on the basket 1 again. Therefore, the handle angle adjustment mechanism 100 of the present application has advantages of simple structure, low production cost, convenient operation and wide range of applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A handle angle adjustment mechanism comprising:
a basket comprising a plurality of first locking portions;
a handle pivoted to the basket via a pivotal shaft; and
an adjusting component disposed between the basket and the handle and slidably on the handle, the adjusting component comprising a first engaging portion for engaging with one of the plurality of first locking portions so as to lock the handle with the basket, the adjusting component sliding to drive the first engaging portion to disengage from the one of the plurality of first locking portions so as to allow the handle to rotate relative to the basket for adjusting an angle of the handle relative to the basket, wherein the handle comprises two positioning components arranged in parallel, and the adjusting component is slidably sheathed on the two positioning components.

2. The handle angle adjustment mechanism of claim 1, wherein the basket further comprises a plurality of first protrusions arranged at intervals along a rotating direction of the handle, and each first locking portion is formed between two adjacent first protrusions of the plurality of first protrusions.

3. The handle angle adjustment mechanism of claim 1, wherein each positioning component is formed in a plated structure, the adjusting component further comprises an operating portion and a sliding portion connected to the operating portion, and a part of the sliding portion protrudes from the operating portion in a radial direction of the pivotal shaft and is slidably disposed on the two positioning components.

4. The handle angle adjustment mechanism of claim 3, wherein an end of the operating portion penetrates out of the handle, the sliding portion is slidably disposed in the handle, and the first engaging portion is disposed on the sliding portion.

5. The handle angle adjustment mechanism of claim 1, wherein the basket further comprises a plurality of second locking portions, and the adjusting component further comprises a second engaging portion for engaging with one of the plurality of second locking portions.

6. The handle angle adjustment mechanism of claim 5, wherein the basket further comprises a plurality of second protrusions arranged at intervals along a rotating direction of the handle, and each second locking portion is formed between two adjacent second protrusions of the plurality of second protrusions.

7. The handle angle adjustment mechanism of claim 5, wherein the plurality of first locking portions are located on an outer periphery of the plurality of second locking portions.

8. The handle angle adjustment mechanism of claim 1, wherein a through slot is formed on the adjusting component, and the pivotal shaft where the handle and the basket are pivoted around penetrates through the through slot.

9. The handle angle adjustment mechanism of claim 8, further comprising a recovering component for resiliently recovering the adjusting component, and the recovering component being disposed in the through slot and connected between the pivotal shaft and the adjusting component.

10. The handle angle adjustment mechanism of claim 1, wherein two ends of the handle are pivotally connected to two sides of the basket, and the handle stretches across the basket.

11. The handle angle adjustment mechanism of claim 1, wherein an accommodating space is formed inside the basket for accommodating a baby.

* * * * *